L. F. VOGT.
METALLURGICAL PROCESS.
APPLICATION FILED JULY 21, 1913.
1,129,029.   Patented Feb. 16, 1915.
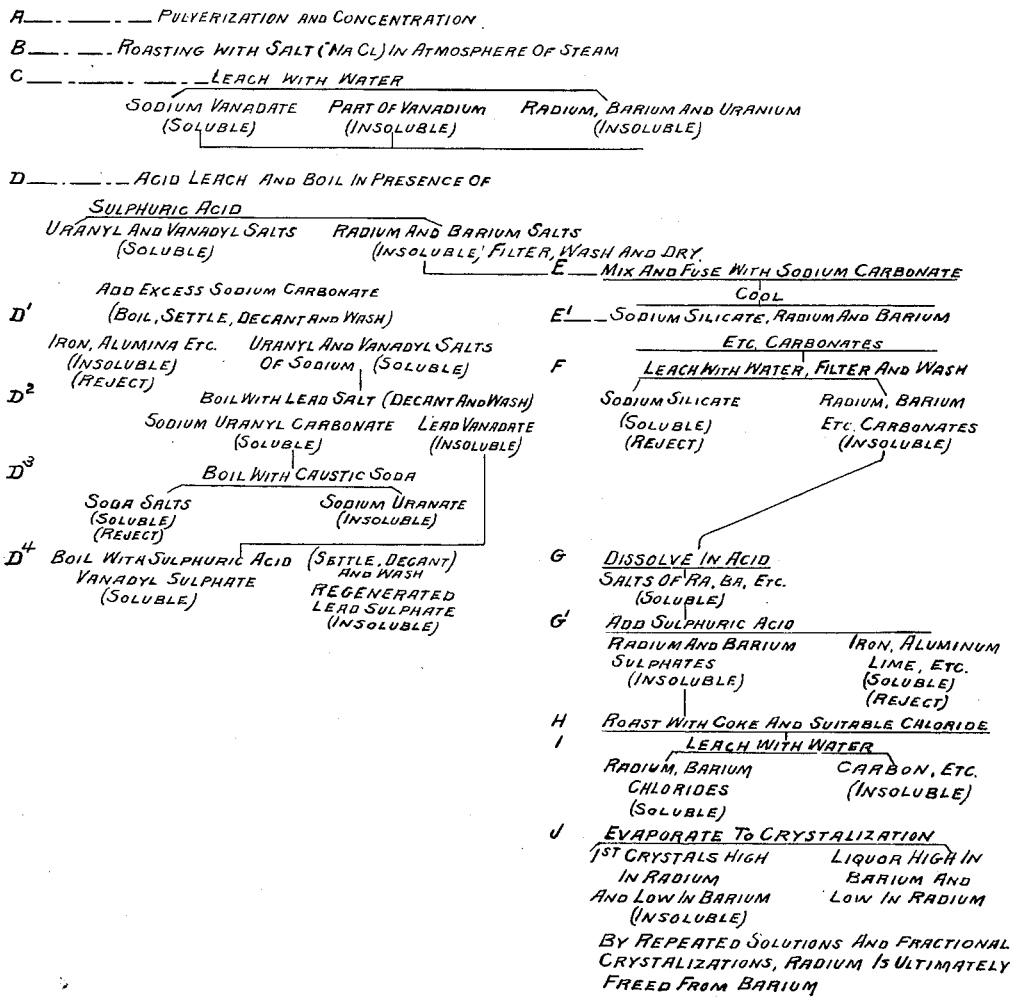

UNITED STATES PATENT OFFICE.

LOUIS F. VOGT, OF WASHINGTON, PENNSYLVANIA, ASSIGNOR TO STANDARD CHEMICAL COMPANY, OF PITTSBURGH, PENNSYLVANIA.

METALLURGICAL PROCESS.

1,129,029.   Specification of Letters Patent.   Patented Feb. 16, 1915.

Application filed July 21, 1913. Serial No. 780,339.

*To all whom it may concern:*

Be it known that I, LOUIS F. VOGT, of Washington, in the county of Washington and State of Pennsylvania, have invented certain new and useful Improvements in Metallurgical Processes; and I do hereby declare the following to be a full, clear, and exact description of the invention, such as will enable others skilled in the art to which it appertains to make and use the same.

This invention relates to an improved metallurgical process for the extraction and recovery of valuable constituents of ores and more particularly to the extraction and recovery of radium, uranium and vanadium from ores such as carnotite ores,—one object of the invention being to so treat ore containing radium, uranium and vanadium as to recover these constituents in maximum quantities.

A further object is to provide a process for the treatment of radium-bearing ore, which shall be operative with commercial success to recover a maximum quantity of the radium content.

A further object is to provide a simple and economical process for treating ore to separately recover valuable constituents, such as radium, uranium and vanadium, or any one or more of such constituents.

A further object is to so treat complex ore containing radium, as to separate from the radium content, the other valuable constituents of the ore, step-by-step, leaving the radium as the final product.

With these and other objects in view, the invention consists in certain novel steps in the treatment of ores as hereinafter set forth and pointed out in the claims.

The accompanying drawing is a diagrammatical illustration of my improved process.

The ore (such for example as carnotite ore) will preferably be first concentrated in any approved manner or it may be merely comminuted (step A). The pulverulent concentrate or ore will then be roasted in the presence of sodium chlorid and steam (step B), the latter being employed for oxidizing purposes. The roasted ore will next be leached with water to remove the greater part of the vanadium content. To the water used in this step of the process, a small amount of sodium carbonate will be added to convert any possible radium or barium chlorid to the carbonate form and prevent the existence of radium or barium in soluble form in the sodium vanadate liquor (step C). After removing the sodium vanadate liquor (which may be stored for subsequent treatment), the solid material or sludge, will be leached with mineral acid, preferably sulfuric acid, to recover the uranium and such vanadium as may remain in the material, in solution. If an acid other than sulfuric be used, sufficient sulfuric acid should be added to form an insoluble radium sulfate and thus prevent any radium content of the sludge from going into solution (step D). The sludge resulting from this step of the process will comprise insoluble radium and barium salts and the liquor will consist of uranyl and vanadyl salts and impurities, in solution.

After separation of the liquor from the sludge, said liquor will be neutralized with sufficient sodium carbonate to precipitate impurities such as iron, alumina, silica, etc., together with a large portion of the uranium and vanadium. If the solution contains impurities in sufficiently large quantity, all of the uranium and vanadium content would be precipitated.

To the mixture (the solution and precipitate) resulting from the neutralizing step above described, an excess of sodium carbonate will be added, and the mixture will be boiled, the purpose of this step being to leach out the uranium and vanadium contained in the precipitate, leaving the impurities in the precipitate (step $D^1$). The uranium and vanadium will now be in solution as sodium compounds of these elements. This solution or liquor will then be separated from the precipitate by filtering or otherwise, and will be treated to recover the uranium and vanadium, as follows: The solution of sodium compounds of uranium and vanadium is treated in a suitable tank with a salt of lead,—such, for example as lead sulfate or carbonate, the whole being agitated and boiled with steam (step $D^2$). The lead salt will react with the vanadium contained in the liquor and form insoluble lead vanadate, while the uranium will remain in solution. The lead vanadate will then be separated from the precipitate or sludge by filtration, decantation or otherwise, and the uranium solution (sodium uranyl carbonate) which is now free from vanadium will be treated for the recovery of the uranium, as follows: The sodium uranyl carbonate solution will be boiled with steam or otherwise and sufficient sodium hydrate will be added to completely precipitate the uranium as sodium uranate (step $D^3$). This precipitate will be separated from the solution and then washed and dried, ready for commercial use.

The lead vanadate resulting from the lead treatment above described may be boiled in sulfuric acid to leach out the vanadium leaving the lead in the form of lead sulfate which may be used again for removing vanadium from the uranium-vanadium solutions hereinbefore described.

The solid matter or sludge, referred to as resulting from step D, and comprising insoluble radium and barium salts and impurities, will be washed, filtered and dried. The dry material will then be thoroughly mixed with sufficient sodium carbonate to flux the mixture when heated in a furnace. The mixture is then subjected to sufficient heat (approximately 2200 F.) in a suitable furnace, to fuse the mixture and render the same fluid, (step E). During this fusing step, the following reactions have taken place: Silica has largely become sodium silicate, and the radium, barium, lime, iron, etc., have become their respective carbonates. The fluid material, upon being discharged from the furnace, will be spread out in a suitable manner to permit it to cool in the form of thin flakes (step E).

The cooled and flaked matte, consisting of carbonates of radium, barium, iron, lime, etc., together with sodium silicate and excess of sodium carbonate, will be treated with water and agitated in a suitable container, so that the sodium silicate contained in the material will be dissolved, leaving the insoluble carbonates suspended in the liquor (step F). These insoluble carbonates will then be separated from the liquor containing sodium silicate, by filtration or otherwise, so that the carbonates may be recovered freed from a large portion of the silica which the material contained. The carbonates will then be washed with water to remove any remaining sodium silicate and free alkali. The said carbonates will then be comminuted in any suitable manner and mixed in water, thus making an aqueous mixture in which the comminuted carbonates are held in suspension. The aqueous mixture of carbonates is introduced into a suitable tank containing mineral acid, preferably hydrochloric, in quantity sufficient to dissolve the carbonates completely, leaving a slight excess of free acid (step G). By now adding sulfuric acid to this solution, radium and barium sulfates are precipitated and remain insoluble, (step $G^1$), while the impurities (such as iron, aluminum and lime) remain in solution. The sulfates of radium and barium will then be separated in any suitable manner from the refuse liquor containing the impurities, and then dried. The dried sulfates of radium and barium, which are now of relatively high radium and barium content, will now be thoroughly mixed with comminuted coke or other suitable carbonaceous material and a suitable chlorid (for example, calcium chlorid), and roasted (step H). During the roasting, the sulfates of radium and barium are converted to chlorids. The roasted mixture will then be leached with water to dissolve the chlorids (step I), leaving insoluble, the remaining carbonaceous material, which latter will be filtered off, leaving the radium and barium chlorids in the liquor. The radium may now be separated from the barium and impurities by systematic fractional crystallization (step J).

It will be observed that during the permanence of my improved process, the uranium, vanadium, and other constituents of the ore are separated, step-by-step from the radium content of the ore, always holding back or leaving the radium content insoluble, until the final separation of the radium from the barium is accomplished by systematic fractional crystallization.

Having fully described my invention what I claim as new and desire to secure by Letters-Patent, is:—

1. The herein described method of reducing carnotite ore for the recovery of the radium content, consisting in roasting the ore in the presence of sodium chlorid and subsequently subjecting the material to successive treatments to remove the vanadium and then the uranium compounds, leaving the radium and barium as insoluble compounds, then converting said radium and barium compounds to a soluble state in solution, and finally subjecting the solution of barium and radium compounds to systematic fractional crystallization and recovering radium salt free from other compounds as a final product.

2. The herein described process of treating ore containing vanadium, uranium and radium, for the successive elimination of vanadium and uranium and the final recovery of a salt of radium, consisting in roasting the ore in the presence of sodium chlorid and an oxidizing agent, leaching the roasted material and obtaining a solution of sodium vanadate, separating the solution from the sludge, leaching said sludge with a solution of sulfuric acid and obtaining uranyl and vanadyl salts in solution, separating the solution from this sludge, then subjecting the last-mentioned sludge to treatment for the elimination of the constituent materials from the radium content, treating said radium content to render the same as a soluble radium salt, and finally recovering said soluble radium salt free from other compounds.

3. The herein described process, consisting in fusing radium bearing material with an alkali carbonate; then leaching with water; then dissolving the resultant radium carbonate in acid; adding sulfuric acid, and recovering radium sulfate.

4. The herein described process, consisting in fusing radium bearing material with an alkali carbonate; then leaching with water; then dissolving the resultant radium carbonate in acid; adding sulfuric acid, recovering radium sulfate; roasting the radium sulfate with carbonaceous material and a chlorid, leaching the roasted mixture and recovering radium chlorid in solution.

5. The herein described process consisting in fusing material containing radium and barium, with an alkali carbonate; then leaching with water; then dissolving the resultant radium and barium carbonates in acid; then adding sulfuric acid; recovering radium and barium sulfates; roasting said sulfates with carbonaceous material and a chlorid; leaching the roasted mixture and recovering chlorids of radium and barium in solution; and then subjecting said solution of radium and barium chlorids to systematic fractional crystallization to remove the barium and recover radium chlorid.

6. The herein described process consisting in roasting ore containing radium, uranium and vanadium in the presence of sodium chlorid and an oxidizing agent; leaching the roasted material and obtaining a solution of sodium vanadate free from radium; leaching the resultant sludge with fluid containing sulfuric acid and obtaining a solution of uranium and vanadium and free from radium; then treating the resultant sludge for recovery of radium.

In testimony whereof, I have signed this specification in the presence of two subscribing witnesses.

LOUIS F. VOGT.

Witnesses:
R. S. FERGUSON,
S. C. HILL.